(12) United States Patent
Steinlage et al.

(10) Patent No.: US 7,568,439 B2
(45) Date of Patent: Aug. 4, 2009

(54) FERTILIZER KNIFE AND POINT STRUCTURE

(75) Inventors: David L. Steinlage, Adel, IA (US); Jarrod R. Ruckle, Bondurant, IA (US); Mike J. Bergmeier, S. Hutchinson, KS (US); Stephen Bruce Albright, Inman, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/939,198

(22) Filed: Nov. 13, 2007

(65) Prior Publication Data

US 2009/0120340 A1 May 14, 2009

(51) Int. Cl.
*A01B 15/00* (2006.01)
*A01B 23/00* (2006.01)
*A01B 31/00* (2006.01)
*A01B 35/20* (2006.01)
*A01B 39/20* (2006.01)

(52) U.S. Cl. .............. 111/123; 172/684.5; 172/699; 172/713; 172/723; 172/724; 172/730; 172/732; 172/762; 172/763; 172/764; 172/768; 172/769; 172/770; 172/772.5; 172/773

(58) Field of Classification Search ........ 172/681, 172/684.5, 685, 690, 699–701, 705–711, 172/713, 721–733, 762–776; 111/118–120, 111/123–126

See application file for complete search history.

(56) References Cited

U.S. PATENT DOCUMENTS

| | | | |
|---|---|---|---|
| 2,874,656 A | 2/1959 | Bennett | |
| 2,904,119 A | 9/1959 | Hunter | |
| 3,092,052 A | 6/1963 | Anderson | |
| 4,033,271 A | 7/1977 | Williams et al. | |
| 4,201,142 A | 5/1980 | Stump | |
| 4,446,927 A | 5/1984 | Robertson | |
| 4,616,580 A | 10/1986 | Moore et al. | |
| 4,638,748 A | 1/1987 | Kopecky | |
| 4,719,862 A | 1/1988 | Edmisson | |
| 4,773,340 A | 9/1988 | Williams et al. | |
| 4,834,189 A | 5/1989 | Peterson et al. | |
| 4,869,328 A | 9/1989 | Carroll | |
| 5,310,009 A | 5/1994 | Rowlet | |
| 5,314,029 A | 5/1994 | Rowlett | |
| 5,452,673 A | 9/1995 | Bruce | |
| 5,787,994 A | 8/1998 | Friesen | |
| 6,167,821 B1 | 1/2001 | Beggs | |
| 6,318,279 B1 | 11/2001 | Rowlet et al. | |
| 6,382,114 B1 | 5/2002 | Lanpher | |
| 6,397,767 B1 | 6/2002 | Dietrich, Sr. | |
| 6,405,665 B1 | 6/2002 | Henry et al. | |
| 6,745,709 B2 | 6/2004 | Rowlett et al. | |
| 6,871,709 B2 | 3/2005 | Knobloch et al. | |
| 6,955,131 B2 | 10/2005 | Beaujot et al. | |
| 6,973,884 B2 | 12/2005 | Dietrich, Sr. | |

*Primary Examiner*—Christopher J. Novosad

(57) ABSTRACT

A knife assembly includes a unique finned point with angled soil-engaging surfaces defining several fracture areas and preventing slabbing to avoid excessive soil disturbance and knife wear. The knife has an extended length between the point and upper mounting brackets to facilitate operation of the point over a substantial range of depths, and the mounting brackets operate above ground level even at maximum point depth operation.

20 Claims, 4 Drawing Sheets

FERTILIZER KNIFE AND POINT STRUCTURE

FIELD OF THE INVENTION

The present invention relates to agricultural implements and, more specifically, to knife and point structure for applying fertilizer below the ground surface.

BACKGROUND OF THE INVENTION

Many growers in the United States are currently switching from conventional tillage methods or minimum tillage methods to zone or strip tillage methods to reduce input costs and increase crop yields. The strip tillage machines currently on the market are designed to perform zone tillage, apply fertilizer, and make a mellow, friable seedbed for the upcoming crop. Residue levels for strip tillage range from light soybean stubble to heavy standing corn stubble.

An implement for zone or strip tillage typically includes a cutting coulter, a row cleaner, and fertilizer injection knife system mounted on a shank assembly and covering disks. The cutting coulter is design to cut residue, and the row cleaner removes crop residue from the formed strip. The shank-mounted fertilizer injection knife system fractures the soil in the strip and applies fertilizer. The covering disks are designed to catch the dirt spray off of the fertilizer knife and move the dirt back over the row to seal the fertilized area and make a berm.

Many of the currently available strip tillage implements have problems with residue flow between the fertilizer knife and closing disks. The residue flow problems result from the operation of attaching brackets for a tall knife at ground level or in the ground when the strip-till bar works at depths from approximately six to ten inches. Residue catches on the brackets and impedes the flow of residue and soil clods between the knife and closing disks. Once there is sufficient residue build up, clearance between the knife and closing disks disappears. With no clearance, the closing disks stop turning and a ball of residue and clods starts to drag. The operator then has to stop the machine to dislodge the plug.

Providing an economical knife point that is long-wearing and has good soil operation characteristics has also been a continuing source of difficulty. Welded knife points have worked well but are expensive to manufacture and usually require replacement of the entire long knife when the point is worn out. Providing good subsurface soil shattering action without soil slabbing, excessive knife side wear, and excessive soil surface inversion and disturbance also continues to be a source of difficulty, especially on fertilizer knives working in strip tillage applications.

SUMMARY OF THE INVENTION

A knife assembly constructed in accordance with the teaching of the present invention includes a unique point defining several fracture areas and preventing slabbing and similar soil action that causes wear on the knife and excessive soil disturbance. The knife has an extended length between the point and upper mounting brackets to facilitate operation of the point over a substantial range of depths, and the mounting brackets operate well above ground level even at the deepest operation. The smooth knife shank sheds residue easily and eliminates the plugging typical in conventional knife assemblies with the bulkier mounting brackets having transversely extending bolts.

DESCRIPTION OF THE PREFERRED EMBODIMENT

Figure 1:
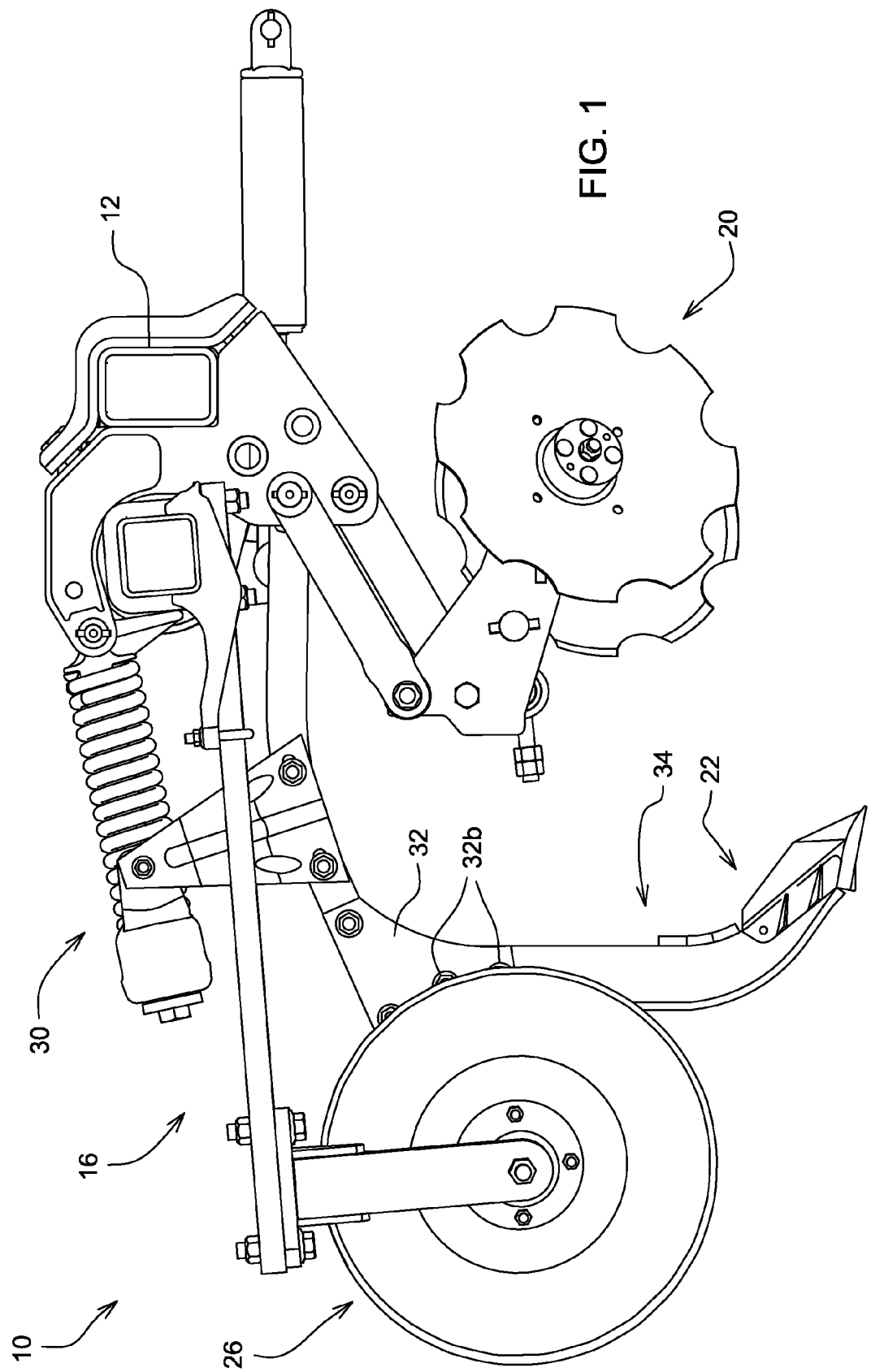
FIG. 1 is a side view of a portion of a strip tillage implement.

Referring to FIG. 1 therein is shown a portion of an implement 10 including a main frame 12 supported for forward movement over the ground. As shown, the implement 10 is a strip tillage machine having a plurality of strip tillage units 16 extending downwardly and rearwardly from the frame 12. Each unit 16 includes a forward cutting coulter for cutting a slit in the row area, a clearing disk assembly 20 for clearing trash from the row area adjacent the slit, and a fertilizer injection knife assembly 22 for penetrating the soil in the area of the slit and depositing fertilizer. A covering disk assembly 26 is located adjacent the knife assembly 22 for moving soil over the penetrated area after the fertilizer is deposited beneath the surface.

The knife assembly 22 includes a spring trip shank assembly 30 connected at a forward end to the frame 12 extending rearwardly to a connection 32 with a long, upright knife 34. A replaceable point 40 is attached to the lower forward portion of the knife 34, and an $NH_3$ tube 44 is attached to rear edge 46 to deliver fertilizer behind the point 40. The area of the connection 32 is offset a substantial distance above the lowermost portion of the point 40 so that the connection 32 is located above the surface of the ground when the point 40 is operating at maximum depth. By way of example for the strip tillage units 16 shown in FIG. 1, the connection 32 is located above the forward tip or edge 40a of the point 40 at least twenty inches. The point 40 can operate over a large range of depths with the connection 32 located above the surface of the soil to help prevent trash build-up and improve soil and trash flow around the knife and the rear of the spring trip standard assembly 30. Typically, the point 40 operates over a depth range that extends from about six inches to approximately ten inches or more.

Figure 2:
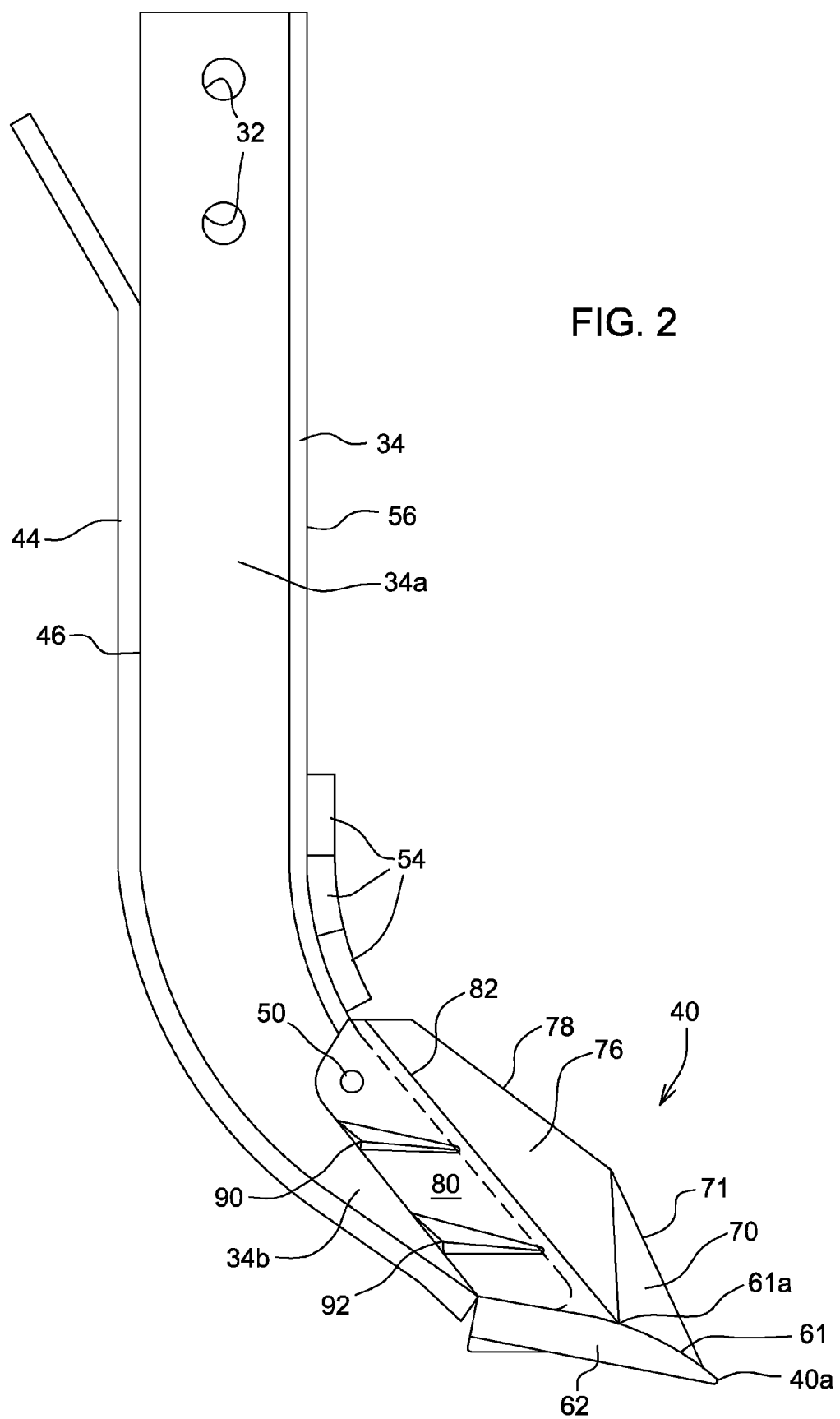
FIG. 2 is an enlarged view of the fertilizer knife and point assembly for the implement of FIG. 1.

The knife 34 includes an upright shank portion 34a terminating at the area of the connection 32, which as shown in FIG. 2, is a pair of offset bolt holes spaced a distance of approximately 2 ¾ inches apart. Two shear bolts 32b connect the upper end of the shank portion 34a to the lower aft end of an arm of the spring trip shank assembly 30.

The knife 34 terminates in a lower, forwardly projecting point receiving portion 34b. The point 40 is matingly received on the portion 34b and includes an upper apertured area 48 pinned to a corresponding apertured area on the knife 34 by a roll pin 50. The point 40 can be easily removed and replaced by driving the roll pin 50 from the apertures, sliding a new point 40 in place on the lower portion 34b and then driving a new roll pin 50 through the apertures.

At the juncture of the upright shank portion 34a and lower portion 34b, segmented shank protectors 54 are welded to front edge 56 of the knife 34. The shank protectors 54 extend upwardly from the top of the point 40 to cover the area of the exposed shank subject to the highest wear.

Figure 3:
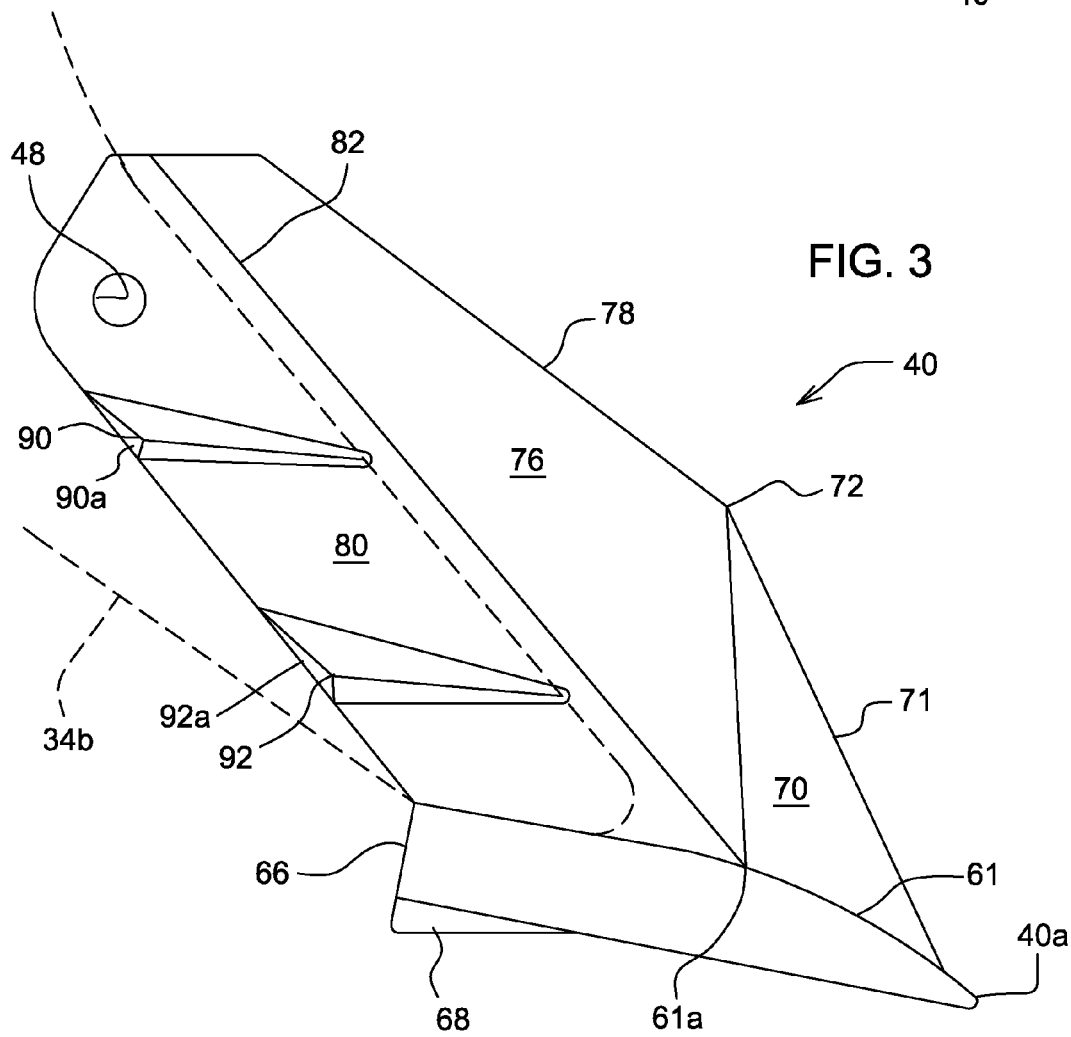
FIG. 3 is an enlarged side view of the point for the assembly of FIG. 2.
Figure 6:
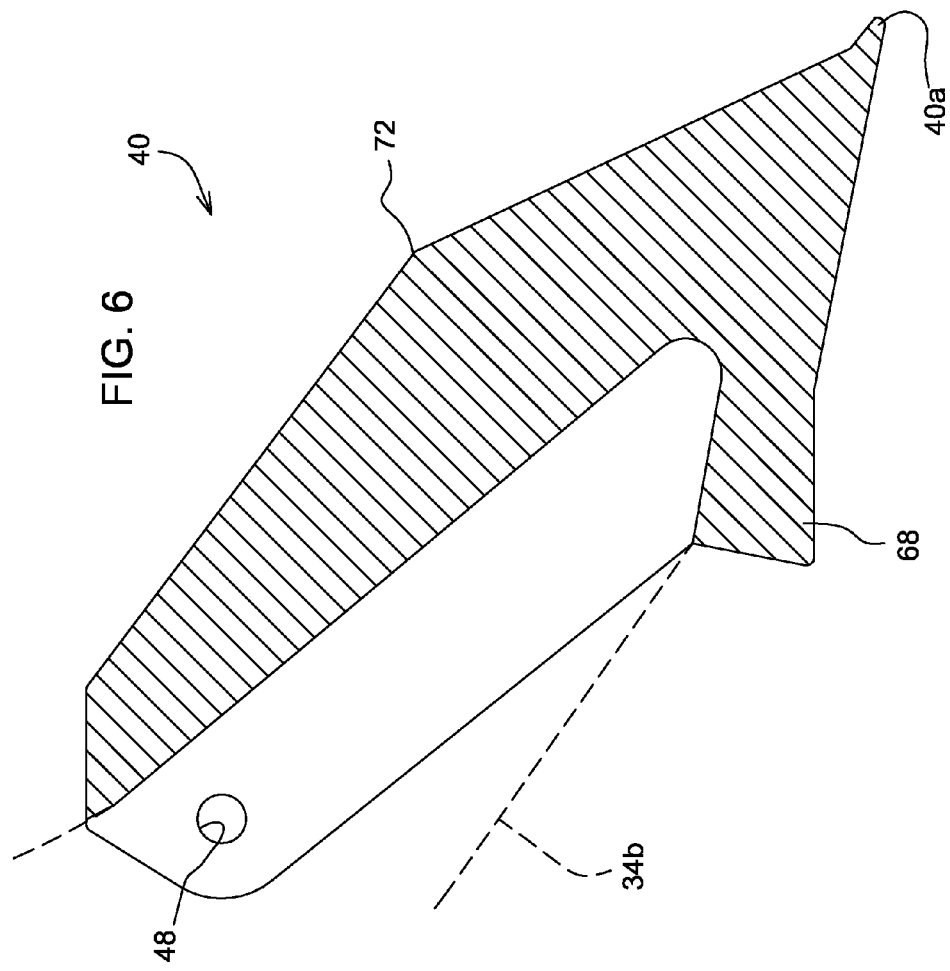
FIG. 6 is a sectional side view of the point taken generally along the lines 6-6 of FIG. 4.

As best seen in FIGS. 2-6, the forward point or edge 40a of the point 40 extends substantially transversely to the forward direction F with a slight rearward taper from the centerline $C_L$ of the point to initially penetrate the soil. As shown, the edge 40a has a width W1 which, as shown in the example, is approximately two inches. A first lift surface 61 extends rearwardly and upwardly from the leading edge 40a. As best seen in FIG. 3, the lift surface 61 is upwardly convex between the edge 40a and locations 61a. The angle of a line tangent to the midpoint of the surface (near the lead line for 61 in FIG. 3) is approximately 31 degrees. The convex lift surface 61 lies generally on a radius of approximately 5 inches centered below the point and initiates gentle lifting action and fracturing of the soil behind the leading edge 40a. Sides 62 of the first surface 61 extend generally parallel to each other and are also spaced a distance W1 apart. The first surface 61 decreases slightly in an upward slope at the locations 61a and terminates in a rearwardly facing upright surface or heel 66. A centrally located small tapered fin 68 projects slightly downwardly from the bottom of the point 40 adjacent the rear surface 66.

Opposed rearwardly diverging soil shattering surfaces 70 project upwardly from the lift surface 61 adjacent the leading edge 40a and extend rearwardly from a forward nose or edge 71 which terminates at a location 72 a substantial distance above the locations 61a. The soil penetrated at the forward area of the surface 61 is lifted to intersect the forward edge 71. The soil is forced outwardly by the diverging surfaces 70 which define a first soil shatter zone. The surfaces 70 terminate generally along a line extending between the locations 61a and 72, and upwardly and outwardly facing surfaces 76 extend rearwardly from that line. The surfaces 76 converge at an upper rearwardly directed edge 78 which extends from the location 72 to the uppermost extremity of the point 40. Soil is forced upwardly and outwardly at the surfaces 76 where the collision of the soil flow from the surfaces 61 and 70 provides another soil shatter zone. At the rear of the surface 61 behind the location 61a where the slope of the surface decreases, soil drops behind the surface 66 to define another shatter zone behind the point heel.

Figure 4:
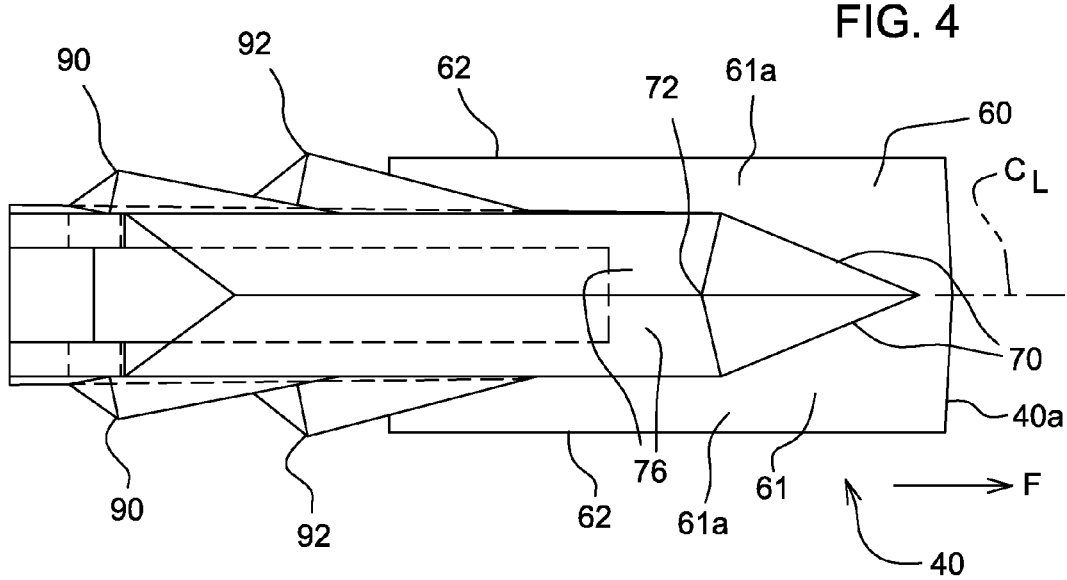
FIG. 4 is a top view of the point of FIG. 3.
Figure 5:
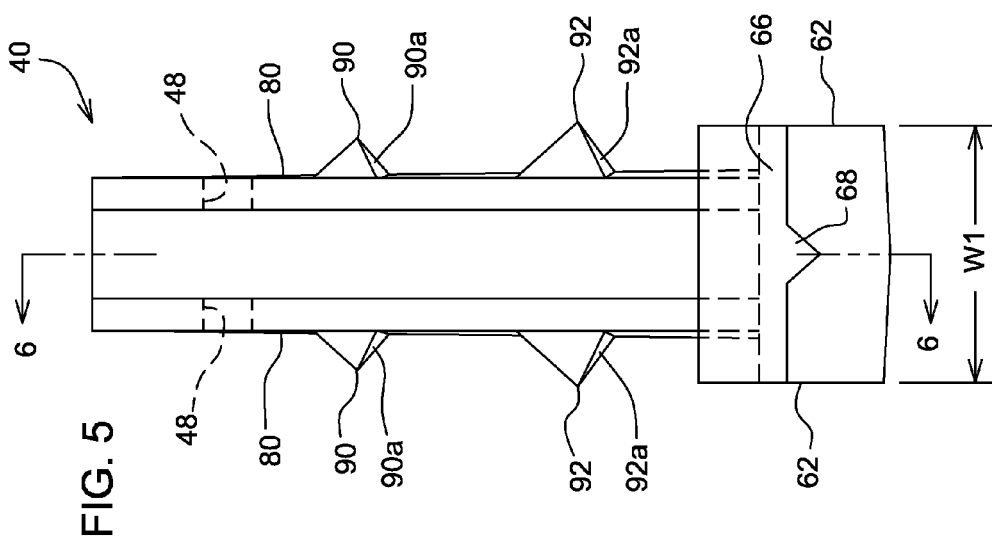
FIG. 5 is a rear view of the point.

Generally parallel side surfaces 80 extend upwardly and rearwardly from the aft portion of the surface 61 along joint lines 82. The distance between the surfaces is less than the distance W1. Protrusions or fins 90 extend outwardly and downwardly from vertically offset locations on the surfaces 80. As best seen in FIGS. 4 and 5, the outermost extremities of the fins 90 are spaced a distance approximately equal to the distance W1. The soil flow off of the surfaces 70 and 76 is lifted by the fins 90 and 92 at locations behind the surfaces adjacent the joint lines 82 and dropped over the aft edges 90a and 92a of the fins 90 and 92 to complete the shattering effect behind the knife 34.

The multiple shatter zones provided by the unique surface configuration and fin structure described above shatters the soil to avoid slabbing effect for reduced draft and reduced wear on the sides of the knife. The point design with multiple shatter zones also reduces soil disturbance and soil inversion on the surface of the ground.

Having described the preferred embodiment, it will become apparent that various modifications can be made without departing from the scope of the invention as defined in the accompanying claims.

The invention claimed is:

1. Fertilizer placement structure for an agricultural implement adapted for movement in a forward direction through the soil, the fertilizer placement structure comprising a replaceable point adapted for attachment to a lower end of an upright fertilizer knife member, the replaceable point including:

a lowermost leading lift surface having a leading edge for penetrating the soil, the lift surface extending rearwardly from the leading edge and having generally parallel lift surface sides terminating in aft rearwardly facing surfaces, the lift surface initially lifting the penetrated soil;

opposed rearwardly diverging soil shattering surfaces projecting upwardly from the lift surface adjacent the leading edge, the shattering surfaces intercepting the penetrated soil lifted by the lift surface and defining a first soil shattering zone;

opposed upwardly and outwardly facing surfaces extending rearwardly and upwardly from aft portions of the soil shattering surfaces, the upwardly and outwardly facing surfaces intercepting soil flow off of the shattering surfaces;

fins extending rearwardly and downwardly from the opposed upwardly and outwardly facing surfaces, the soil flow off of the shattering surfaces dropping downwardly off the fins to further shatter the soil; and wherein the point includes a non-welded knife attaching portion located adjacent the lowermost leading lift surface facilitating removal of the point from the knife member without need to replace the knife member.

2. The fertilizer placement structure of claim 1 wherein the aft rearwardly facing surfaces of the lift surface are located directly below the fins, wherein the soil drops downwardly behind the aft rearwardly facing surfaces to further shatter the soil.

3. The fertilizer placement structure of claim 2 wherein the fins comprise two vertically offset fins extending outwardly on each side of the point.

4. The fertilizer placement structure of claim 1 further comprising an upright knife having a lower end supporting the replaceable point, the upright knife having a substantially vertical central shank portion terminating in an uppermost connection portion.

5. The fertilizer placement structure of claim 4 wherein the uppermost connection portion is offset at least 20 inches above the leading edge.

6. The fertilizer placement structure as set forth in claim 1 wherein the shank attaching structure comprises a pin-receiving aperture located adjacent the fins.

7. The fertilizer placement structure as set forth in claim 1 wherein the shank attaching structure comprises a pin for releasably attaching the point to the lower end of the knife member adjacent the fins.

8. Fertilizer placement structure for an agricultural implement adapted for movement in a forward direction through the soil, the fertilizer placement structure comprising a replaceable point, the replaceable point including:

a lowermost leading lift surface having a leading edge for penetrating the soil, the lift surface extending rearwardly from the leading edge and having generally parallel lift surface sides terminating in aft rearwardly facing surfaces, the lift surface initially lifting the penetrated soil;

opposed rearwardly diverging soil shattering surfaces projecting upwardly from the lift surface adjacent the leading edge, the shattering surfaces intercepting the penetrated soil lifted by the lift surface and defining a first soil shattering zone;

opposed upwardly and outwardly facing surfaces extending rearwardly and upwardly from aft portions of the soil shattering surfaces, the upwardly and outwardly facing surfaces intercepting soil flow off of the shattering surfaces;

fins extending rearwardly and downwardly from the opposed upwardly and outwardly facing surfaces, the soil flow off of the shattering surfaces dropping downwardly off the fins to further shatter the soil wherein the aft rearwardly facing surfaces of the lift surface are located directly below the fins, wherein the soil drops downwardly behind the aft rearwardly facing surfaces to further shatter the soil, wherein the aft rearwardly facing surfaces of the lift surface are located directly below the fins, wherein the soil drops downwardly behind the aft rearwardly facing surfaces to further shatter the soil; and wherein the fins have outermost extremities and wherein the lift surface has width approximately equal to the distance between the outermost extremities.

9. Fertilizer placement structure for an agricultural implement adapted for movement in a forward direction through the soil, the fertilizer placement structure comprising:

a replaceable point, an upright knife having a lower end supporting the replaceable point, the upright knife having a substantially vertical central shank portion terminating in an uppermost connection portion, wherein the replaceable point includes a lowermost leading lift surface having a leading edge for penetrating the soil, the lower end of the upright knife having a forward point receiving portion non-weldably attaching the replaceable point adjacent the lowermost leading lift surface, the lift surface extending rearwardly from the leading edge and having generally parallel lift surface sides terminating in aft rearwardly facing surfaces, the lift surface initially lifting the penetrated soil; opposed rearwardly diverging soil shattering surfaces projecting upwardly from the lift surface adjacent the leading edge adjacent the forward point receiving portion, the shattering surfaces intercepting the penetrated soil lifted by the lift surface and defining a first soil shattering zone; opposed upwardly and outwardly facing surfaces extending rearwardly and upwardly from aft portions of the soil shattering surfaces, the upwardly and outwardly facing surfaces intercepting soil flow off of the shattering surfaces; and wherein the upper connection portion is located at least 20 inches above the leading edge of the replaceable point.

10. The fertilizer placement structure of claim 9 including fins extending rearwardly and downwardly from the opposed upwardly and outwardly facing surfaces, wherein the aft rearwardly facing surfaces of the lift surface are located directly below the fins, and wherein the soil drops downwardly behind the aft rearwardly facing surfaces to further shatter the soil.

11. The fertilizer placement structure of claim 10 wherein the fins comprise two vertically offset fins extending outwardly on each side of the point.

12. The fertilizer placement structure of claim 9 wherein the point is operable at a depth of 6 to 10 inches, and the uppermost connection portion is offset above the soil when operating at a depth of 10 inches.

13. The fertilizer placement structure of claim 12 wherein the uppermost connection portion is connected to a spring trip shank assembly.

14. Fertilizer placement structure for an agricultural implement adapted for movement in a forward direction through the soil, the fertilizer placement structure comprising:

a replaceable point;

an upright knife having a lower end supporting the replaceable point, the upright knife having a substantially vertical central shank portion terminating in an uppermost connection portion;

wherein the replaceable point includes a lowermost leading lift surface having a leading edge for penetrating the soil, the lift surface extending rearwardly from the leading edge and having generally parallel lift surface sides terminating in aft rearwardly facing surfaces, the lift surface initially lifting the penetrated soil; opposed rearwardly diverging soil shattering surfaces projecting upwardly from the lift surface adjacent the leading edge, the shattering surfaces intercepting the penetrated soil lifted by the lift surface and defining a first soil shattering zone; opposed upwardly and outwardly facing surfaces extending rearwardly and upwardly from aft portions of the soil shattering surfaces, the upwardly and outwardly facing surfaces intercepting soil flow off of the shattering surfaces;

fins extending rearwardly and downwardly from the opposed upwardly and outwardly facing surfaces, wherein the aft rearwardly facing surfaces of the lift surface are located directly below the fins, the soil drops downwardly behind the aft rearwardly facing surfaces to further shatter the soil, and the fins comprise two vertically offset fins extending outwardly on each side of the point; and wherein the fins have outermost extremities and the lift surface has width approximately equal to the distance between the outermost extremities.

15. Fertilizer placement structure for an agricultural implement adapted for movement in a forward direction through the soil, the fertilizer placement structure comprising a replaceable point, the replaceable point including a lowermost leading lift surface having a leading edge for penetrating the soil, the lift surface being convex upwardly and extending rearwardly from the leading edge, the lift surface having generally parallel lift surface sides terminating in aft rearwardly facing surfaces and initially lifting and fracturing the penetrated soil; opposed rearwardly diverging soil shattering surfaces projecting upwardly from the lift surface adjacent the leading edge, the shattering surfaces intercepting the penetrated soil lifted by the lift surface and defining a first soil shattering zone; opposed first and second upwardly and outwardly facing surfaces extending rearwardly and upwardly from aft portions of the soil shattering surfaces, the upwardly and outwardly facing surfaces intercepting soil flow off of the shattering surfaces; two vertically offset fins extending rearwardly and downwardly from the two opposed upwardly and outwardly facing surfaces, the soil flow off of the shattering surfaces dropping downwardly off the fins to further shatter the soil; the aft rearwardly facing surfaces of the lift surface are located directly below the fins, wherein the soil drops downwardly behind the aft rearwardly facing surfaces to further shatter the soil; and the fins have outermost extremities and wherein the lift surface has width approximately equal to the distance between the outermost extremities.

16. The fertilizer placement structure of claim 15 further comprising an upright knife having a lower end supporting the replaceable point, the upright knife having a substantially vertical central shank portion terminating in an uppermost connection portion, wherein the uppermost connection portion is offset at least 20 inches above the leading edge.

17. The fertilizer placement structure of claim 16 wherein the point is operable at a depth of 6 to 10 inches, and the uppermost connection portion is offset above the soil when operating at a depth of 10 inches.

18. The fertilizer placement structure of claim 17 wherein the uppermost connection portion is connected to a spring trip shank assembly.

19. The fertilizer placement structure of claim 15 wherein the lift surface lies generally on a radius and defines an upper surface angle of approximately 31 degrees at a central location rearwardly of the leading edge.

20. The fertilizer placement structure of claim 19 wherein the radius is approximately 5 inches and is centered below the point.

* * * * *